[19] United States Patent
Pettit

[11] 3,888,271
[45] June 10, 1975

[54] MOTION-RESPONSIVE SHUTOFF VALVE
[76] Inventor: Marshall G. Pettit, 255 E. Sandra, Tulare, Calif. 93274
[22] Filed: Mar. 25, 1974
[21] Appl. No.: 454,726

[52] U.S. Cl. .................. 137/45; 137/68; 251/74
[51] Int. Cl. .................................... F16k 17/36
[58] Field of Search ................ 137/45, 68–71; 251/74

[56] References Cited
UNITED STATES PATENTS
2,255,965  9/1941  Brandon .................. 137/69 X Primary Examiner—Martin P. Schwadron
Assistant Examiner—Richard Gerard
Attorney, Agent, or Firm—Huebner & Worrel

[57] ABSTRACT

A motion-responsive shutoff valve particularly suited for use in terminating a flow of fluid therethrough in response to motion imparted thereto. The valve is characterized by an axially displaceable, spring-loaded closure plug seated in a valve housing and supported for axial advancement from a valve-open position to a valve-close position, a lever arm, supported by a fulcrum for restraining the closure plug against displacement to a valve-close position, a frangible rod for supporting the lever arm against pivotal motion, and a pair of pendulous masses suspended adjacent to said frangible rod and adapted to fracture the frangible rod in response to motion imparted to said housing for releasing the lever arm, whereby the closure plug is released to advance to its valve-close position for thereby interrupting the flow of fluid.

6 Claims, 4 Drawing Figures

3,888,271

PATENTED JUN 10 1975

SHEET 1

MOTION-RESPONSIVE SHUTOFF VALVE

BACKGROUND OF THE INVENTION

The invention relates to motion-responsive shutoff valves and more particularly to a valve for interrupting the flow of a fluid therethrough in response to motion imparted thereto.

For the sake of safety and other reasons which should readily be apparent, it often is desirable to terminate a flow of certain fluids, such as natural gas, gasoline, fuel oil, and even water in areas which have been subjected to a devastating earthquake, a severe storm or another catastrophic occurrence of a similar nature. In an effort to achieve this result shutoff valves, of numerous designs, intended to terminate the flow of a fluid, in response to a rupture of conduits connected therewith, have been proposed.

In practice, such valves frequently include solenoids which respond to an interruption of electrical signals for closing the valve. Unfortunately, an interruption of electrical signals may occur in an instance where it is totally undesirable to interrupt the flow of fluid through a given valve, such as where a normal power failure is experienced. Therefore, it can readily be appreciated that a great deal of inconvenience inadvertently may be experienced when employing solenoid actuated valves.

Additionally, a use of vibration-responsive valves has been proposed for use in environments subject to earthquakes and explosions. Such valves are typified by those shown in U.S. Pat. No. 1,742,685 which issued Jan. 7, 1930 to Arthur H. Brandon and U.S. Pat. No. 2,054,563 which issued Sept. 15, 1936 to Sidney H. Hansen. While the vibration-responsive valves of the prior art may function satisfactorily in certain environments, such valves are generally inefficient and impractical, particularly in instances where the valves must operate rapidly and efficiently after quiescent periods of extended durations. As should, therefore, be apparent, there currently exists a need for a practical, economic and dependable shutoff valve having a minimal number of component parts capable of interrupting a flow of fluid through the valve, after relatively long periods of quiescence, in response to motion of a predetermined magnitude imparted thereto.

It is therefore a general purpose of the instant invention to provide a practical, economic and highly dependable motion-responsive shutoff valve for interrupting a flow of fluid therethrough in response to motion incident to earthquakes, explosions, impact, and similar catastrophic events imparted thereto.

OBJECTS AND SUMMARY OF THE INVENTION

It is therefore an object of the instant invention to provide an improved motion-responsive shutoff valve which overcomes the aforementioned disadvantages and difficulties.

It is another object to provide an improved shutoff valve which responds to motion imparted thereto for positively interrupting a flow of fluid therethrough.

It is another object to provide an economic, dependable and simplified shutoff valve having a reduced number of mechanical components.

It is another object to provide in a shutoff valve the improvement including a motion-responsive mechanism, including a frangible release mechanism for initiating the closing of the valve in response to motion imparted thereto.

These and other objects and advantages are achieved through an inclusion of a spring, for continuously urging a closure plug to advance from a valve-open position to a valve-close position, a restraining mechanism connected in supporting relationship with the closure plug, for restraining the closure plug from advancing to its valve-close position, and a release mechanism including a frangible support member and a pendulous mass for fracturing the frangible support member in response to motion imparted to the valve, as will hereinafter become more readily apparent by reference to the following description and claims in light of the accompanying drawings.

DESCRIPTION OF THE PREFERRED EMBODIMENT

Figures 1, 4:
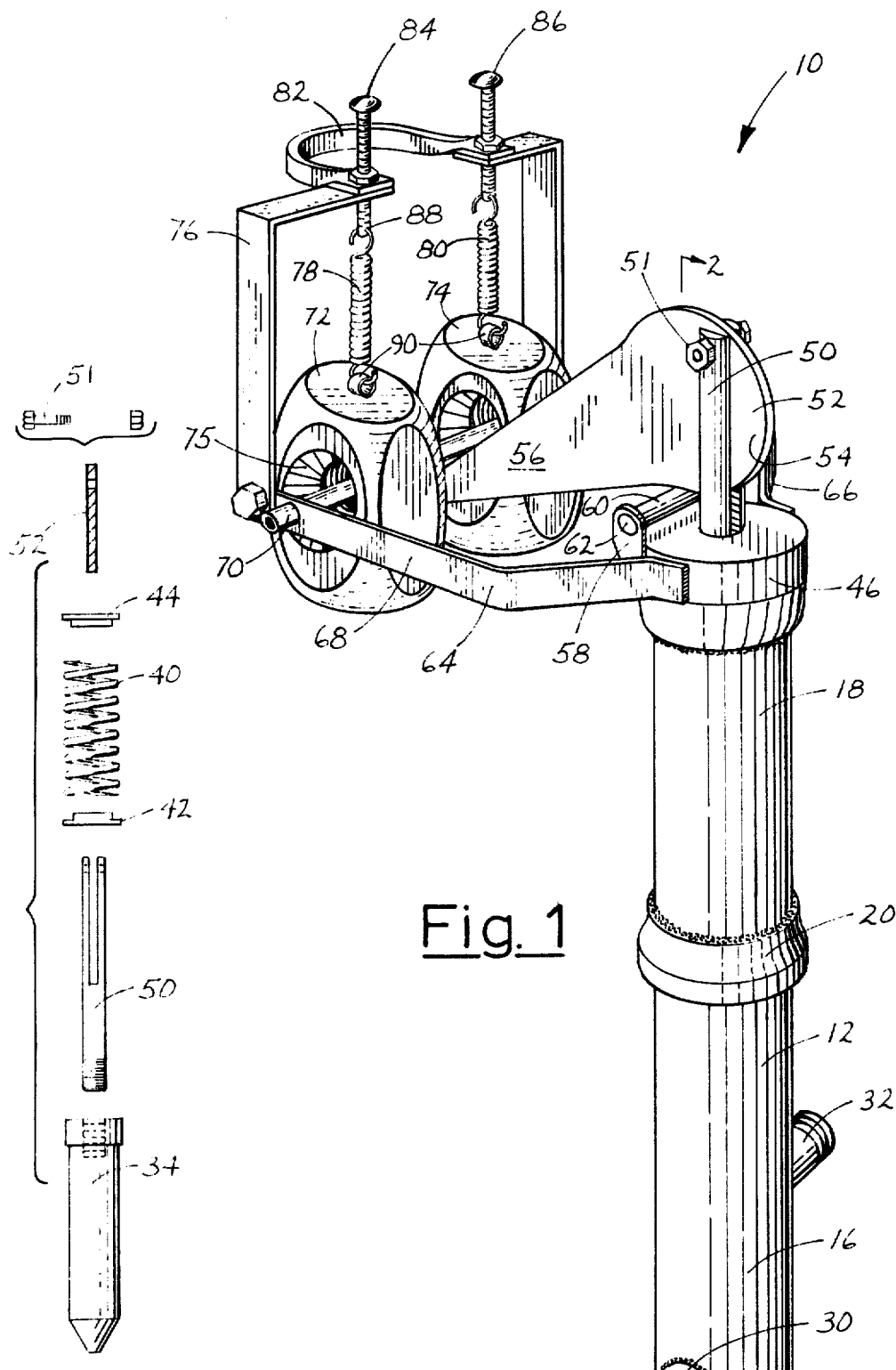
FIG. 1 is a perspective view of an improved motion-responsive shutoff valve which embodies the principles of the instant invention.
FIG. 4 is an exploded view of the closure plug and biasing means shown in FIG. 2.

Referring now with more specificity to the drawings wherein like reference characters designate like or corresponding parts throughout the several views, there is shown a motion-responsive shutoff valve, generally designated 10, which embodies the principles of the instant invention.

It is to be understood that the valve 10 is particularly suited for use as a shutoff valve for fluid circuits employed in delivering either flammable or non-flammable fluids, including both gases and liquids. However, it is to be understood that the valve 10 is particularly suited for interrupting a flow of flammable gases in response to motion imparted thereto incident to earthquakes of predetermined magnitudes, shock waves generated by explosions, and vibrations imparted thereto through impact.

Figure 2:
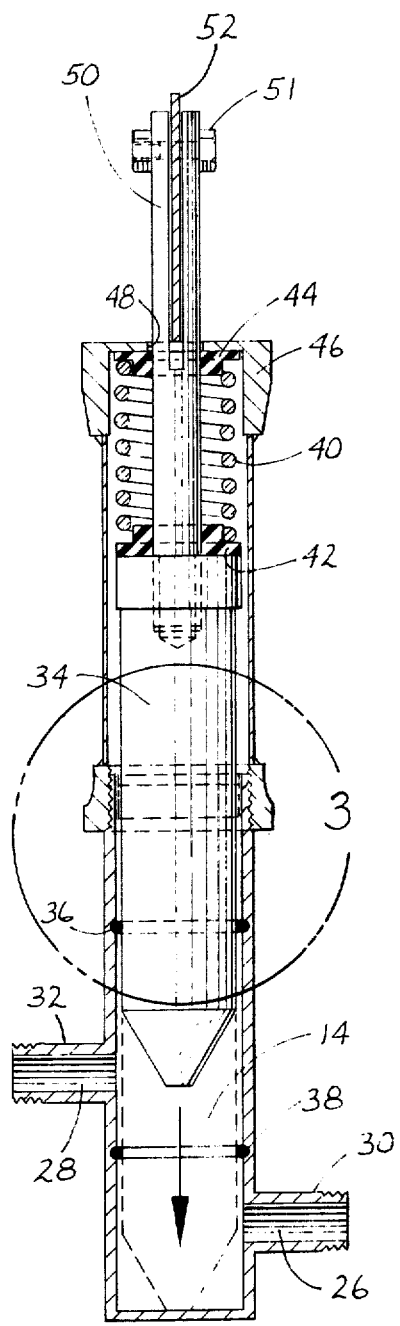
FIG. 2 is a sectional view taken generally along line 2—2 of FIG. 1, on somewhat of a reduced scale.
Figure 3:
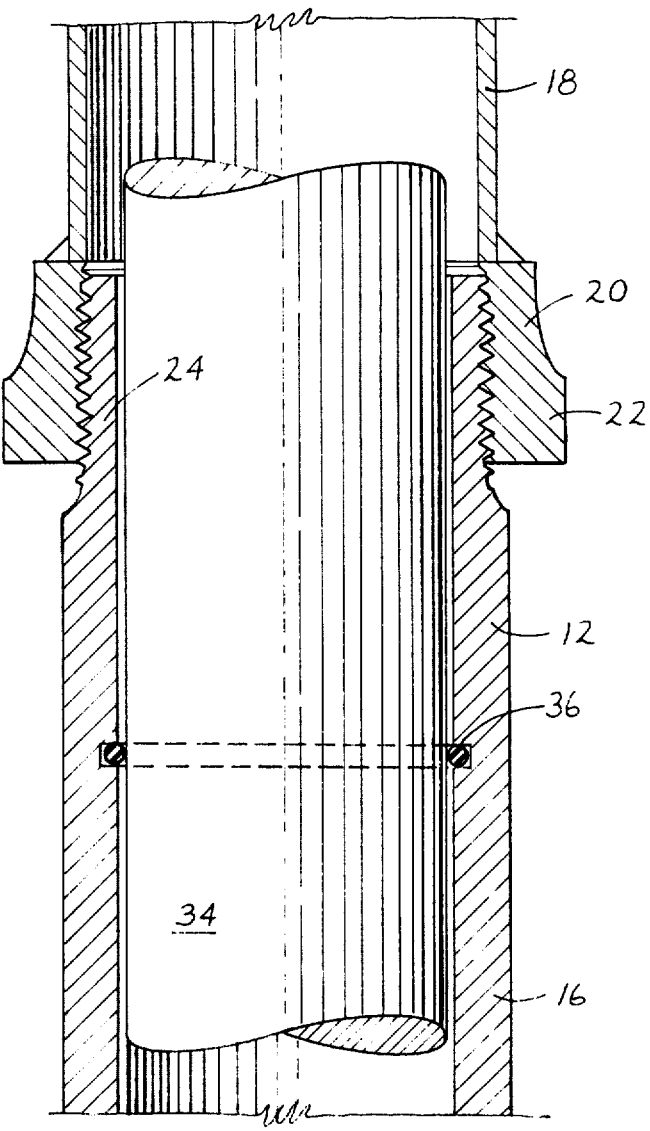
FIG. 3 is a fragmented, partially sectioned detail view, taken generally at the encircled area designated 3 in FIG. 2.

The valve 10 includes a housing 12 having defined therein a chamber 14 of a substantially cylindrical configuration, FIG. 2. As a practical matter, the housing 12, as shown, includes a base segment 16 and a distal segment 18, coupled with the base segment 16. As a practical matter, the segments 16 and 18 are united through a convenient coupling 20 including an internally threaded collar 22, welded or otherwise securely affixed to the segment 18, and an externally threaded portion 24 provided for the base segment 16.

The base segment 16 further includes a pair of abaxially aligned, diametrically opposed ports 26 and 28 which communicate through the chamber 14 when the valve is in a valve-open configuration, as illustrated in FIG. 2. Extended in coaxial alignment with each of the ports 26 and 28, there is provided a nipple 30 and 32, respectively, through which the chamber 14 is afforded communication with a fluid circuit, not shown. It is to be understood that either of the ports 26 or 28 serves as an inlet port for the chamber 14, as desired, while the other port serves as a discharge port therefor.

Seated for rectilinear motion within the housing 12 there is a closure plug 34. The closure plug 34 is of a cylindrical configuration and is of a length greater than the axial distance between the ports 26 and 28 but less than the axial dimension of the chamber 14. Thus the closure plug 34 is alternately positionable in a valve-open position, as illustrated in solid lines, in FIG. 2, and a valve-close position, as illustrated in dash lines, also illustrated in FIG. 2.

The cylindrical wall of the base segment 16 of the housing 12, within the chamber 14, is provided with a pair of annular grooves, not designated, within which there is seated a pair of annular seals 36 and 38. The seal 36 is located between the port 28 and the distal segment 18 of the housing 12. This seal is supported in a continuous circumscribing relationship with the closure plug 34. The annular seal 38, on the other hand, circumscribes the chamber 14 in a plane orthogonally related to a longitudinal axis of the chamber and interposed between the ports 26 and 28. Thus the seal 36 serves continuously to isolate the ports 26 and 28 from the distal segment 18 of the housing 12, while the seal 38 serves to establish a seal about the closure plug 34, when the plug is in a valve-close disposition, for thus mutually isolating the ports 26 and 28. Of course, once the ports 26 and 28 have been mutually isolated, all flow of fluid through the chamber 14 is terminated.

The closure plug 34 is continuously urged toward its valve-close disposition within the chamber 14 by a compression spring 40 coaxially aligned with the plug 34 and seated in contiguous engagement therewith. As a practical matter, a spring mount 42, of an annular configuration, is interposed between the spring 40 and the closure plug 34. The spring mount 42 preferably is formed of brass, synthetic resins and other similar non-ferrous material for obviating an inherent propensity of the spring to create sparks within the chamber 14 as it acts on the closure plug 34.

A similar mount 44 is provided at the opposite end of the spring 40. The spring mount 44 seats against the internal surface of a closure cap 46 welded to the housing 12 for thus sealing the chamber 14 at the distal end thereof. The cap 46 also includes a concentric bore 48 through which there is extended a clevis lug 50 which projects axially from the closure plug 34. The clevis lug 50 is concentrically related to the spring 40 and passes through suitably formed openings, not designated, provided in the mounts 42 and 44 and extends axially from the housing 12 a suitable distance.

A clevis pin 51 is provided for pinning to the clevis lug 50 a lever arm 52. The lever arm 52 includes a bulbous base segment 54 having a substantially circular configuration, and a tapered distal segment 56 integrally related to the base segment 54.

Mounted by a suitable bracket 58 affixed to the cap 46, in a plane orthogonally related to the longitudinal axis of the chamber 14, there is a roller 60 which functions as a fulcrum for the lever arm 52. As a practical matter, the roller 60 is of a cylindrical configuration and is pinned to the bracket 58 by a suitable bearing pin 62 extended axially therethrough. The roller 60 is so positioned as to engage the arcuate surface of the base segment 52 of the lever arm 50, as the lever arm is pivoted, for thus obviating the effects of sliding friction.

Moreover, in order to multiply the distance through which the clevis lug 50 is displaced, as pivotal motion is imparted to the lever arm 52, the clevis lug 50 is connected to the lever arm 52 in an eccentric relationship with the base segment 54. Also secured to the cap 46, as by welding or the like, and projected in a plane orthogonally related to the longitudinal axis of the chamber 14, there is a bracket 64. This bracket includes a pair of coplanar arms, designated 64 and 68. Near the distal ends of the arms 66 and 68, there is provided a pair of suitable openings, not designated, through which is extended a frangible member 70 of a rod-like configuration. In practice, the frangible member 70 is a glass rod which readily fractures upon impact but which will withstand shear forces gradually applied thereto. The purpose of the frangible member 70 is to support the distal segment 56 of the lever arm 52 in a depressed relationship relative to the base segment 54 of the lever arm, once the distal segment of the lever arm has been rotated to a depressed relationship with the base segment 52, about the fulcrum established by the roller 60, for displacing the closure plug to its valve-open position.

It is, therefore, to be understood that the closure plug 34 is supported in its valve-open disposition, relative to the chamber 14, by the lever arm 52, the distal segment of which, in turn, is supported in a depressed relationship with the base segment thereof by the frangible member 70. However, once the frangible member 70 is fractured, the lever arm 52 is released so that the spring 40 becomes effective for imparting linear displacement to the closure plug 34 for thereby seating the closure plug 34 in its valve-close disposition within the chamber 14.

Fracturing of the frangible member 70 is achieved through the use of a pair of pendulous masses, designated 72 and 74, suspended from a suitable bracket 76 by a pair of tension springs 78 and 80, respectively. The bracket 76 is, in practice, of a generally inverted U-shaped configuration having a pair of opposed legs affixed to the distal ends of the arms 66 and 68. Preferably, the mid portion of the bracket 76 is relieved in order to accommodate passage of the distal segment 56 of the lever arm 52 to pass therethrough as the spring 40 advances the closure plug 34 to its valve-close disposition. In practice, a splicing member 82 of an arcuate configuration is employed for coupling coaxially aligned portions of the base of the inverted U-shaped bracket 76 immediately adjacent to the relief formed therein.

The tension springs 78 and 80 are connected with the bracket 76 through a pair of axially extensible anchor pins 84 and 86, respectively. Each of these pins is threadedly received by the bracket 76 and includes an eye 88 for connecting one of the springs 78 and 80 therewith. Similarly, each of the pendulous masses 72 and 74 also is provided with an eye, designated 90, to which the opposite end of one of the springs 78 and 80 is attached. Thus, each of the masses 72 and 74 is supported in a manner such that oscillatory motion necessarily is imparted thereto in response to motion imparted to the housing 12 of the valve 10. Of course, such motion causes the pendulous masses to strike and fracture the frangible member 70, whereupon the lever arm 52 is released.

OPERATION

It is believed that in view of the foregoing description, the operation of the device will readily be understood and it will be briefly reviewed at this point.

With the valve 10 assembled in the manner hereinbefore described, and connected within a circuit employed for delivering fluid under pressure through the chamber 14, the closure plug 34 is retracted into its valve-open position, against the applied forces of the spring 40 as the lever arm 52 is rotated about the roller 60 in a direction such that the distal segment 56 of the lever arm 52 is depressed relative to the base segment 54.

Once the distal segment 56 of the lever arm 52 has been depressed, relative to the base segment 54, for establishing a flow of fluid through the valve, the frangible member 70 is extended through the bores 75 provided within the pendulous masses 72 and 74 and then anchored in the openings, not designated, provided in the distal ends of the arms 66 and 68 of the bracket 64. Thus, the valve 10 is readied for operation but may remain in an extended state of quiescence, while an established flow of fluid is maintained through the valve.

In the event the valve 10 is subjected to motion, induced through earthquakes, explosions, or impact, motion is transmitted to the pendulous masses 72 and 74. Motion thus transmitted causes the pendulous masses to strike and fracture the frangible member 70, whereupon the lever arm 52 is released. Release of the lever arm 52, in turn, permits the spring 40 to displace the closure plug 34 toward its valve-close position wherein the closure plug is caused to pass through the annular seal 38, whereupon an hermetic seal is established about the surface of the closure plug in a plane interposed between the axis of the ports 26 and 28. Thus the ports are mutually isolated so that the flow of fluid through the chamber 14 is thus interrupted.

It will, of course, be appreciated that the valve 10 can again be readied for operation simply by again depressing the distal end of the lever arm 52, about the fulcrum provided by the roller 60, and securing the distal end of the lever arm in a depressed relationship, relative to the base segment, by inserting a new frangible member 70 through the openings provided in the distal ends of the arms 66 and 68 of the bracket 64, and in concentric relationship with the bore 75 provided in each of the pendulous masses 72 and 74.

In view of the foregoing, it should readily be apparent that the valve of the instant invention is an economic, practical and dependable valve which can readily be employed in interrupting a flow of fluid in response to motion incident to earthquakes, explosions and impacts.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In a motion-responsive shutoff valve of the type including a valve housing, means for conducting a flow of fluid through said housing and an axially displaceable closure plug seated in said housing and supported for advancement from a valve-open position to a valve-close position, the improvement comprising:
   A. biasing means for continuously urging said closure plug to advance from a valve-open position to a valve-close position;
   B. restraining means for restraining the plug from advancement toward said valve-close position including,
      a fulcrum, a lever arm supported by said fulcrum characterized by a first end portion connected to said closure plug and a second end portion adapted to be supported against angular displacement about the fulcrum, and means for supporting said second end of said lever arm against angular displacement including a frangible member disposed in supporting engagement with said lever arm; and
   C. means for releasing the closure plug for advancement toward said valve-close position in response to motion imparted to said housing comprising motion-responsive means including a pendulous mass for fracturing said frangible support member.

2. The improvement of claim 1 wherein said frangible support member comprises a glass rod adapted to be supported near its opposite ends with the mid portion thereof disposed in contiguous engagement with the second end portion of said lever arm and said restraining means further includes means for supporting said glass rod near its opposite ends.

3. The improvement of claim 2 wherein said pendulous mass includes a spring-suspended body having means defining therein a bore extended therethrough for receiving said glass rod.

4. An improved motion-responsive shutoff valve comprising:
   A. a valve housing;
   B. means defining within said housing a fluid path extending therethrough;
   C. a closure plug supported within said housing for linear displacement from the valve-open position in spaced relation with said path to a valve-close position within said path including a clevis extended therefrom;
   D. a compression spring seated in said housing in contiguous relation with said closure plug for urging the closure plug to advance in linear displacement from said valve-open position to said valve-close position;
   E. restraining means connected with said closure plug for restraining the plug against linear displacement including a a fulcrum, a lever arm supported by said fulcrum having one end connected with said clevis, and means including a frangible rod for supporting the opposite end of said lever arm against displacement; and
   F. a pendulous mass suspended externally of said housing for fracturing the frangible rod in response to motion imparted to the housing.

5. The valve of claim 4 wherein said pendulous mass comprises a body supported in suspension by a tensioned resilient member and includes means defining therein a bore concentrically receiving said frangible rod.

6. An improved motion-responsive shutoff valve comprising:
   A. a valve housing including a cylindrical wall defining a cylindrical cavity within said housing;
   B. means defining a fluid path extending through said housing including a pair of diametrically opposed, abaxially aligned ports extended through said wall and communicating through said cavity;

C. an annular seal seated in said wall in circumscribing relation with said cavity between the ports of said pair;
D. a closure plug of a cylindrical configuration disposed within said cavity and supported for linear displacement from a valve-open position, wherein the plug is supported in spaced relation with said annular seal, to a valve-close position wherein the surface of said plug is seated in a sealed, circumscribed relationship with said annular seal;
E. a compression spring seated in said housing in coaxial, contiguous relation with said closure plug for continuously urging said plug to move along a linear path from said valve-open position to said valve-close position;
F. means connected with said closure plug for restraining the plug against movement along said linear path including a clevis extended axially from said closure plug, a lever arm supported externally of said housing by a fulcrum and having one end connected with said clevis for supporting said closure plug in said valve-open position when the opposite end of the lever arm is supported in a depressed relationship with said one end; and
G. means for releasibly supporting the opposite end of the lever arm in a depressed relationship with said one end, including a pair of pendulous masses suspended at opposite sides of the opposite end of the lever arm, each of said masses including means defining therein a rod-receiving bore, and a frangible rod extended through said pair of pendulous masses and supported against motion near each of its opposite ends engaging the lever arm near the opposite end thereof for maintaining the opposite end of the lever arm in a depressed relationship with said one end of the lever arm.

* * * * *